(12) United States Patent
Lange et al.

(10) Patent No.: US 9,699,003 B2
(45) Date of Patent: Jul. 4, 2017

(54) DYNAMIC ALLOCATION AND VIRTUALIZATION OF NETWORK RESOURCES IN THE ACCESS NETWORK AND IN CUSTOMER NETWORKS

(71) Applicant: Deutsche Telekom AG, Bonn (DE)

(72) Inventors: Christoph Lange, Berlin (DE); Dirk Kosiankowski, Eichwalde (DE)

(73) Assignee: DEUTSCHE TELEKOM AG, Bonn (DE)

( * ) Notice: Subject to any disclaimer, the term of this patent is extended or adjusted under 35 U.S.C. 154(b) by 75 days.

(21) Appl. No.: 14/538,858

(22) Filed: Nov. 12, 2014

(65) Prior Publication Data
US 2015/0131679 A1 May 14, 2015

(30) Foreign Application Priority Data
Nov. 13, 2013 (EP) .................................... 13192685

(51) Int. Cl.
| H04L 12/64 | (2006.01) |
| H04L 12/24 | (2006.01) |
| H04W 16/04 | (2009.01) |
| H04W 64/00 | (2009.01) |

(52) U.S. Cl.
CPC .......... *H04L 12/64* (2013.01); *H04L 12/6418* (2013.01); *H04L 41/0833* (2013.01); *H04L 41/0896* (2013.01); *H04W 16/04* (2013.01); *H04L 41/5096* (2013.01); *H04W 64/00* (2013.01)

(58) Field of Classification Search
CPC ....................................................... H04L 12/64
USPC .......................................................... 370/468
See application file for complete search history.

(56) References Cited

U.S. PATENT DOCUMENTS

| 6,430,273 | B1* | 8/2002 | Shaheen | H04L 12/2856 370/480 |
| 6,845,248 | B1* | 1/2005 | Johnson | H04M 11/062 379/399.01 |
| 7,095,759 | B1* | 8/2006 | Fitzgerald | H04J 3/247 370/352 |
| 7,965,635 | B1* | 6/2011 | Regan | H04L 47/21 370/235 |
| 8,341,717 | B1* | 12/2012 | Delker | H04L 63/20 705/56 |
| 8,581,439 | B1* | 11/2013 | Clayton | H02J 9/00 307/23 |
| 8,667,399 | B1* | 3/2014 | Brandwine | G06Q 10/0633 715/738 |

(Continued)

*Primary Examiner* — Melvin Marcelo
*Assistant Examiner* — Peter G Solinsky
(74) *Attorney, Agent, or Firm* — Leydig, Voit & Mayer, Ltd.

(57) ABSTRACT

A method of dynamically allocating network resources in an access network and a customer network includes: determining, by a control unit, positions of all users of the customer network; bringing, by the control unit, the customer network and/or a component of the customer network into a first predefined state, based on determining that no user of the customer network is checked in to the customer network; and reallocating, by the control unit, an access port of an access multiplexer assigned to the customer network to an access network resource pool, based on determining that no user of the customer network is checked in to the customer network.

15 Claims, 4 Drawing Sheets

(56) References Cited

U.S. PATENT DOCUMENTS

| | | | | |
|---|---|---|---|---|
| 8,892,093 B1* | 11/2014 | Wurtenberger | H04W 48/18 | 370/252 |
| 9,319,892 B2* | 4/2016 | De Domenico | H04W 16/32 | |
| 2007/0116056 A1* | 5/2007 | Cruz | H04M 11/062 | 370/487 |
| 2008/0183307 A1* | 7/2008 | Clayton | G05B 19/042 | 700/8 |
| 2009/0069004 A1* | 3/2009 | Ergen | H04W 36/22 | 455/422.1 |
| 2009/0154421 A1* | 6/2009 | Hong | H04L 12/66 | 370/331 |
| 2009/0201988 A1* | 8/2009 | Gazier | H04N 21/222 | 375/240.06 |
| 2010/0240397 A1* | 9/2010 | Buchmayer | H04J 11/0069 | 455/456.1 |
| 2011/0183704 A1* | 7/2011 | Moreno | H04W 52/0229 | 455/522 |
| 2012/0076149 A1* | 3/2012 | Ko | H04L 12/433 | 370/395.53 |
| 2013/0222369 A1* | 8/2013 | Huston | G06T 17/00 | 345/419 |
| 2014/0032728 A1* | 1/2014 | O'Neil | G06F 9/4893 | 709/223 |
| 2014/0035814 A1* | 2/2014 | de Lima | G06F 1/3265 | 345/158 |
| 2014/0095601 A1* | 4/2014 | Abuelsaad | G06F 13/10 | 709/204 |
| 2014/0123273 A1* | 5/2014 | Matus | G06F 21/32 | 726/17 |
| 2014/0254371 A1* | 9/2014 | Chan | H04L 49/90 | 370/235 |
| 2014/0301301 A1* | 10/2014 | Cheng | H04L 5/0048 | 370/329 |
| 2014/0354531 A1* | 12/2014 | Foreman | G06F 3/0481 | 345/156 |
| 2015/0208340 A1* | 7/2015 | Webb | H04W 52/0235 | 370/311 |
| 2016/0198292 A1* | 7/2016 | Sponza | H04W 4/02 | 455/456.1 |

* cited by examiner

DYNAMIC ALLOCATION AND VIRTUALIZATION OF NETWORK RESOURCES IN THE ACCESS NETWORK AND IN CUSTOMER NETWORKS

CROSS-REFERENCE TO RELATED APPLICATIONS

Priority is claimed to European Patent Application No. EP 13 19 2685.9, filed on Nov. 13, 2013, the entire disclosure of which is hereby incorporated by reference herein.

FIELD

The present invention generally relates to the field of telecommunications. In particular, the invention refers to the realization of hybrid (landline and mobile radio) connections using grid-bound and radio access network components and associated control means.

BACKGROUND

Telecommunication networks usually consist of broadband and mobile radio network sections. Broadband networks for example consist of access, aggregation and core networks and associated optical transport networks for the aggregation and core networks. On the other hand, mobile radio networks consist of mobile radio access and core network sections.

Landlines provide via grid-bound accesses connections to customer locations, whereas the mobile radio networks ensure access to the telecommunication network via radio access solutions. The historical development of these two network types was largely independent, so that nowadays there are still often parallel structures. Moreover, both types of customer connections serve different purposes (such as landline connection of a stationary building and ensuring accessibility of a mobile customer over the mobile radio network), so that customers often have a mobile radio connection in addition to a landline connection.

In telecommunication networks, the trend is nowadays towards convergent networks, i.e. a convergence of landline and mobile radio network structures, and even towards hybrid connections providing the customer with a broadband product so as to transmit and provide parts of the total bit rate via the landline and parts over the mobile radio connection.

Customer landline connections and the respective landline customer networks are typically connection- or port-oriented, i.e. the DSLAM port allocated to a customer for a DSL connection (digital subscriber line; DSLAM: DSL access multiplexer) or for a telephone connection (DIV port, Port einer digitalen Vermittlungsstelle, port of a digital exchange) is permanently wired to the customer access line. The port can then only be used by this customer even when in fact it is not used over a relatively short or long period of time (e.g. during the night or a longer period of absence, such as during a holiday). Thus, network capacity on the provider side is blocked, which on the one hand leads to costs for network expansion (capital expenditures, CapEx) and operational costs (operational expenditures, OpEx), for example for energy consumption and maintenance. Also, if assigned statically, any permanently assigned IP addresses (Internet Protocol) may be blocked depending on the realization. If logged on and registered in the net, mobile radio units likewise permanently require net resources—here of course no "permanently wired" port is required, but IP addresses, the capacity of a mobile radio cell etc. According to the state of the art, the customer net at the customer's location is operated and controlled independently from the provider network and thus often permanently operated—in accordance with the "Always-On/Always-Connected" paradigm.

This conventional principle is shown in FIG. 1: a connection of a private customer having a home network is shown that is connected to the telecommunication network of his/her network provider via a DSL line so as to be granted access to the Internet. Due to this connection, a DSLAM port is permanently allocated—irrespective of the actual utilization. The home network consists of a Home Gateway (HGW) as central node to which various home network units and components are connected via wire or WLAN, here, e.g. a PC, a laptop, one or more telephones, an NAS memory (Network Attached Storage) as well as a Set Top Box (STB) for receiving digital TV signals over the broadband connection. Moreover, the persons in this household usually possess several mobile telephones, which are likewise part of this representation and are connected to the network by the mobile radio base station. At present, both DSLAM and mobile radio base stations are connected to switches or routers (aggregation switch (AGS) or Border Network Gateway (BNG)) of the next network level (aggregation/metro networks). The adjoining cloud "further network sections" of FIG. 1 represents additional network sections ensuring the customer's connectivity to the next Internet access node (PoP: Point of Presence).

Due to the conventional structure of network components and their mode of interoperability, network resources in the provider network, such as DSLAM ports for the broadband access network or in the DIV (digital exchange), are statically assigned and permanently wired to the telephone network. It is therefore necessary to install a corresponding amount of access ports in the network even if they are not permanently required. This causes capital expenditures and later, in operation, operational expenditures (e.g. for maintenance and energy consumption).

SUMMARY

In an embodiment, the invention provides a method of dynamically allocating network resources in an access network and a customer network. The method includes: determining, by a control unit, positions of all users of the customer network; bringing, by the control unit, the customer network and/or a component of the customer network into a first predefined state, based on determining that no user of the customer network is checked in to the customer network; and reallocating, by the control unit, an access port of an access multiplexer assigned to the customer network to an access network resource pool, based on determining that no user of the customer network is checked in to the customer network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
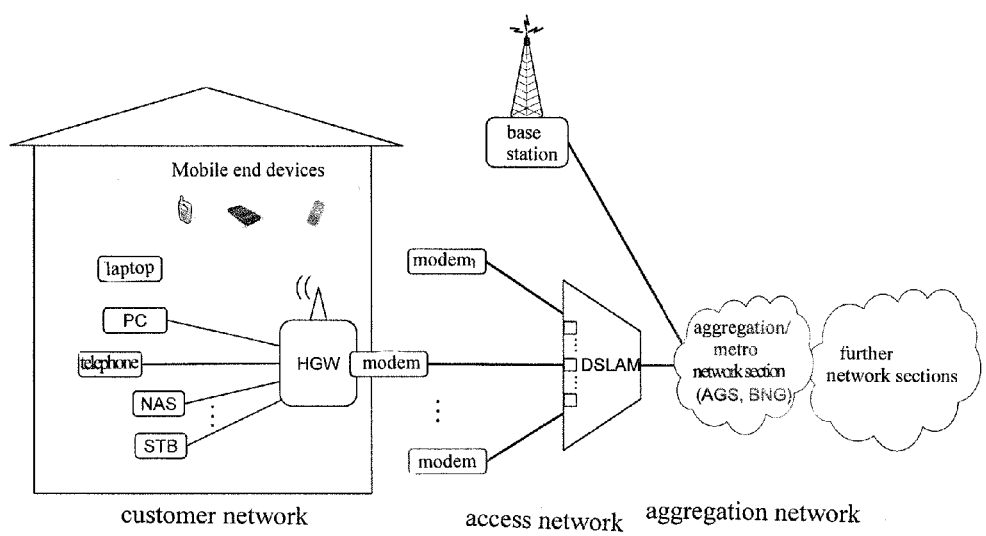
FIG. 1 is a basic schematic view of a conventional network structure.

Embodiments of the invention provide a solution that reduces capital and operational costs by optimizing expansion and operation. In particular, the present invention provides for dynamically assigning network resources on the basis of a hybrid landline and mobile radio connection and the associated user and use information so as to cost-efficiently use network capacities, cost- and energy-efficiently configure provider networks and control customer networks and their components for achieving a relatively high energy efficiency. The services used by customers are not affected by this dynamic assignment of resources.

Moreover, components of the customer network (here, e.g., home network), which is in the customer's responsibility and operated by the customer, are often permanently operated or at least longer than necessary (e.g. for having "forgotten" to switch off devices or out of convenience). Thus, there is a potential of diminishing customer's energy consumption and the corresponding energy costs. The respective control means according to the present invention assists in reducing the energy consumption of the home network at the customer's end so as to minimize corresponding energy costs.

Furthermore, with the present invention, a selection of services is made continuously available. Even when the user is not at home and has no access to the home network end devices, these services should remain adequately usable so that the service range is improved.

The present invention provides a method and a system for dynamically assigning network resources in the access network and at least one customer network. According to the present invention, the positions of all users of the customer network are determined first. If it is determined that no user of the customer networks is checked in to the customer network, the customer network or at least one of its components is brought into a first predefined state. All components of the customer network can for example be brought into a standby or sleep mode. Further, in this event at least one access port of an access multiplexer assigned to the customer network is deallocated to the access network resource pool, in particular a DSLAM port. Notably, the access multiplexer is usually a component of the access network (at the provider's end).

If it is determined that at least one user is within the reach of the customer network, at least one access port is preferably allocated to the customer network and the customer network or at least one of its components is brought into a second predefined state. Some devices of the customer network can, for example, be brought into an active operating mode, whereas others may remain in the standby or sleep mode.

Moreover, at least one preset incoming or outgoing communication request and/or at least one service request of a user of the customer network can be transferred to a mobile communication device of the user, should the user not be checked in to the at least one customer network. The communication/service request may also be transferred to a virtual instance, e.g., by providing the requested service as a software-based solution from a data centre.

Any deallocated access port is preferably allocated to a further customer network, which, however, should be a network in which a customer utilisation is currently detected by ascertaining at least one user in the customer network and which therefore requests connection to the provider network over the access network.

If at least one user is checked in to a mobile radio network, but not to the customer network, additional resources may be activated and provided to the mobile radio network. This, however, should only be done if actually requested by the communication or service request.

The present invention further provides a method and a system for dynamically controlling network resources in a data network. The method includes load-adaptive switching and/or transferring network capacity in all network sections of a data network, in particular a core network, on the basis of the currently available capacity. The available capacity is determined taking into account allocated and/or deallocated access ports of at least one customer network and/or taking into account the users checked in to at least one mobile radio network and not checked in to the at least one customer network. Preferably, the access ports are allocated and/or deallocated according to the method of the present invention.

The respective states of the access network resource pool, which for example describe which customer network is currently allocated to which access port, are preferably stored in a central network memory means ("Cloud"), in particular so as to simplify or facilitate any interference suppression processes.

In the following, the invention will be described in more detail with reference to the drawings.

With the method and system according to the present invention, ports may be dynamically allocated in the access network, if necessary, communication paths and services may be transferred from the landline to the mobile radio connection and devices and components of the customer network may be controlled on an event basis in accordance with the presence and absence of potential users.

Figure 2:
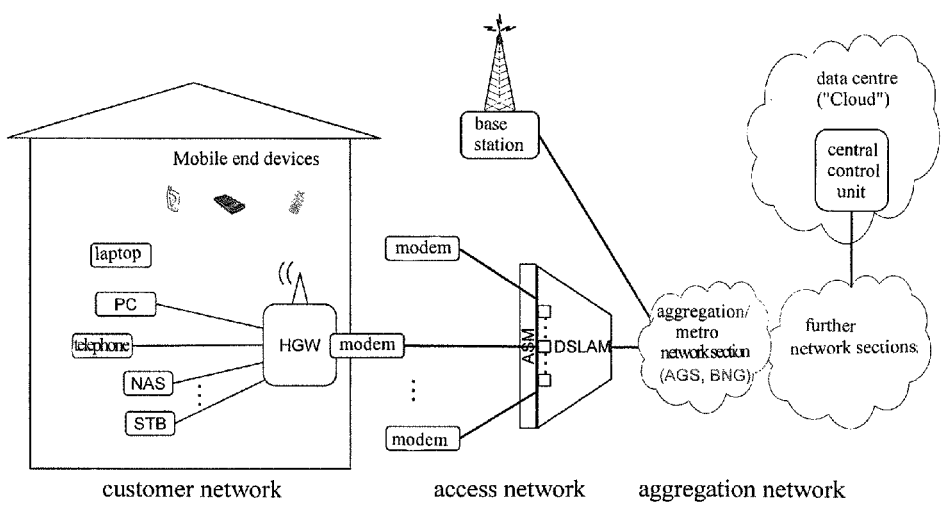
FIG. 2 is a basic schematic view of a network structure according to an embodiment of the invention.

FIG. 2 shows the system and the underlying principle: Starting point is the state in which the users are in a house, their mobile phones are in the house and the home network is in operation. If the users leave the house one after the other, this is detected by means of the position of each mobile phone (e.g. via GPS or mobile phone tracking or the use of movement sensors within the house), whereupon the current position of each mobile device (or the landline in case of immobile sensors in the house) is signalled to the central control unit (ZSI; zentrale Steuerinstanz) via the mobile radio network. Here, this central control unit is, for example, in a data centre or the "Cloud".

If the central control unit detects that all users (or the last user) have left the house, in a first step it starts bringing the customer network and the associated access line into the state intended for this event. To this end, first all home network components are switched off in a controlled manner or brought into a predefined idle state over the access line. The user may program (in advance) which devices are to be brought into which idle state (e.g., standby, deep sleep). Thus, components that should not be switched off remain in an operational state. The home network components are switched via the "normal" communication channel, i.e. the access line. The application for controlling and coordinating this activity, the central control unit, resides in the data centre.

In a second step, the access line or more exactly the access port (e.g. at the DSLAM), is "given back": The information that all users have left home and the components of the customer network have been brought into an idle state in a controlled manner is signalled by the central control unit to the DSLAM and in particular the automatic switching matrix (ASM; also cross connect, Loop Management System (LSM)) installed therein. The ASM is a means for switching access lines in a flexible and electronically controlled manner to DSLAM ports. Thus, the rigid allocation of DSLAM port and access line (or residence connections) is no longer existent. The ASM can be electro-mechanically realised as a crossbar switch or electronically, e.g., on an FPGA basis (field programmable gate array). The deallocated DSLAM port is "transferred" into the pool and can now be used for another access line. When the original "owner" of the DSLAM port returns home, he/she is flexibly assigned a new, generally different DSLAM port from the free pool. The call numbers, customer-specific port settings and communication relations, however, remain and are not varied by this dynamic-flexible assignment of network resource(s). So as to facilitate maintenance and any troubleshooting in the ASM, the ASM states may also be stored in the "Cloud" by means of the central control unit, i.e. in a central memory, such as a data centre.

Moreover, the information of all users having left the house can be used to redirect all or predetermined incoming communication requests to a predetermined mobile device or, in case of several users belonging to the household, to several predetermined and uniquely determined users (e.g. using the allocation of mobile telephone numbers and email addresses). For example, it can be preset that telephone calls should be directly redirected, but not email messages including large attachment. Further network services, in particular those involving the Cloud, such as telephone answering machines in the network or facsimile reception in the network, are possible. This is to enhance the service quality and the user's experience.

In a third step, additional capacities are activated and provided in the mobile radio network, which may be subject to higher loads,—in the cells in which the relevant mobile phones now are—so as to cope with the communication requests that are partly redirected. More generally, network capacities in all network sections involved can be dynamically switched or redirected in this third step: In the aggregation network and, e.g., likewise in the core network, capacities can be redirected on the basis of the information provided by the central control unit—if required by the available capacity so far. This dynamic resource allocation as regards the capacity in the entire network corresponds—at least in part—to a load-adaptive operation. As compared with conventional network operation, in which the capacity is allocated statically and not in correspondence with the requirements, which vary over time, i.a. energy efficiency may be improved.

If the first user returns home, this is signalled to the central control unit by the positioning of the respective mobile device and the mobile radio network, whereupon the aforementioned process proceeds in reverse order:

First, again a DSLAM port, which generally differs from that allocated before, is allocated to the connection terminal over the ASM. Then, the preset home network components are brought into a predetermined active operating state and the assigned communication relations are redirected back into the home network.

The present invention enables a resource-conserving network structure and utilisation. As compared to conventional network structures and the conventional mode of operation, this involves at least the following advantages:

The DSL ports are dynamically allocated, if required. On average, less ports (and thus DSLAMs) can therefore be installed in the network than access lines for connecting all customer connection terminals are necessary, since concurrence effects may be utilised as not all customers are always simultaneously active. The ports are enabled from a pool, which saves capital cost for the network structure.

On the whole, less DSL ports have to be operated. Therefore, as compared with known network designs and modes of operation, less maintenance and energy is required, which saves operating costs.

Network resources, such as capacity, IP addresses and thus ports may be dynamically allocated so that the aforementioned concurrence effects can here also be profitably used.

From an economical point of view, the automated control of the customer network and its components helps saving a significant amount of energy as compared to the conventional operation.

Embodiment 1: Virtualisation of Basic Services

Figure 3:
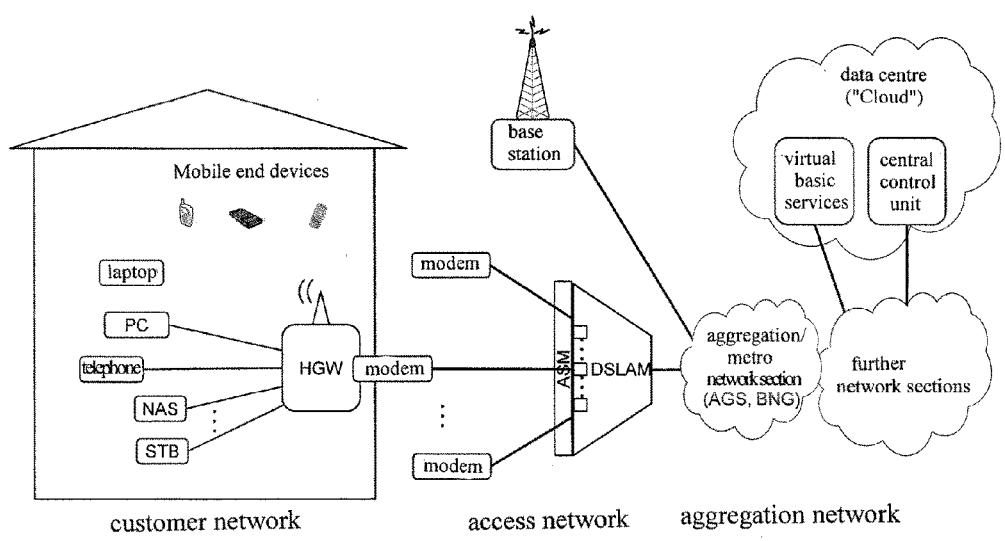
FIG. 3 shows a network structure according to the present invention, wherein basic services are virtualized.

FIG. 3 shows an embodiment of the present invention for basic services realised as virtual instance in the "Cloud". If the user is not at home and network resources (e.g., DSLAM port) are given back to the "pool", connectivity to the user's home gateway/modem is no longer given. The basic functions, however, such as telephone and facsimile reception, still have to be provided. This can be realised via the mobile radio device (portable phone, smart phone) for outgoing telephone calls and facsimiles. For incoming telephone calls and facsimiles, an individual application is installed for each user in the data centre, which installation redirects telephone calls to the mobile radio device or a virtual answering machine.

When the home network is again active and the user is at home, the stored calls are synchronised on the associated devices in the home network environment. This can for example be accomplished by the display/signalling on the telephone "call" from the network answering machine.

Embodiment 2: Virtualisation of Home Network Components

Figure 4:
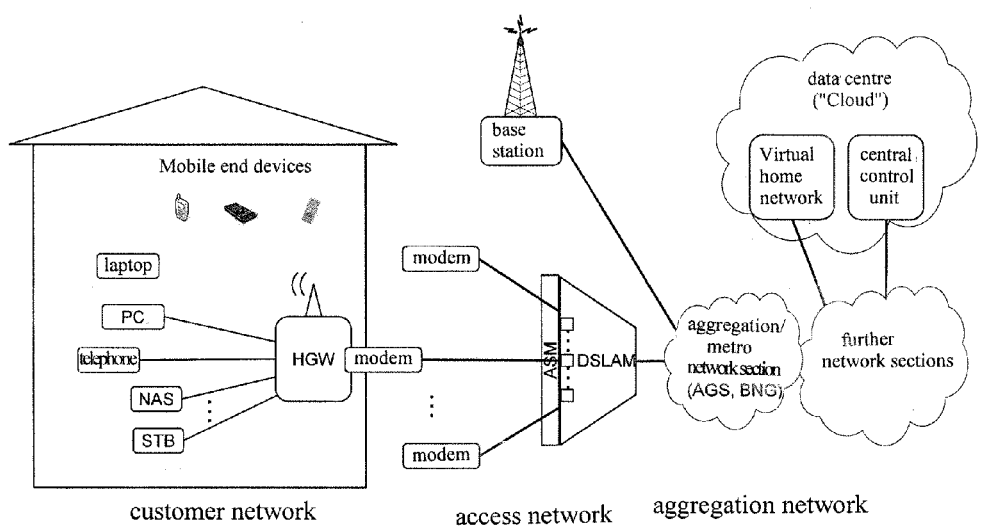
FIG. 4 shows a network structure according to the present invention, wherein home network components are virtualized.

The virtualisation of home network components according to FIG. 4 constitutes a further embodiment of the present invention in which parts of the home network are virtualised in addition to the aforementioned basic principle: thus, in case the user is not at home and the home network is in an idle state, the data centre (the "Cloud") allocates a respective capacity portion for storage and processing for a certain period of time and provides the user therewith. The user, e.g., is capable of using the usual PC applications; later, when the home network is again active, the data are synchronised on the PC so that the document and data bases are consistent. A virtual STB in the "Cloud" is a further example for the use of virtualised home network components. With this virtual STB, it is possible to record pre-programmed TV broadcast even if the STB in the home network is in an idle state since nobody is at home. If the home network is again activated, the programmed broadcast is transferred to the STB of the home network.

Although the invention is shown and described in detail by the drawings and the corresponding description, this representation and detailed description are merely illustrative and exemplary and do not restrict the invention. It is of course possible for skilled persons to make amendments and changes without leaving the scope of the following claims. In particular, the invention also comprises embodiments and any combinations of features mentioned or shown above regarding different aspects and/or embodiments.

The invention also comprises individual features in the drawings, even if they are shown therein in combination with other features and/or have not been mentioned above.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of dynamically allocating network resources in an access network and a customer network, comprising:
   determining, by a central control unit at a data center, positions of all users of the customer network;
   determining, by the central control unit, that no user of the customer network is checked in to the customer network based on the determined positions of all users of the customer network as being away from the customer network; and
   in response to determining that no user of the customer network is checked in to the customer network:
      bringing, by the central control unit, the customer network and/or a component of the customer network into a first predefined state; and
      deallocating, by the central control unit, an access port of an access multiplexer assigned to the customer network and transferring the deallocated access port to an access network resource pool, wherein the access network resource pool comprises one or more unallocated access ports usable for access lines corresponding to customer networks.

2. The method of claim 1, further comprising:
   determining that a user of the customer network has returned to the customer network;
   in response to determining that the user of the customer network has returned:
      allocating a new access port to the customer network from the access network resource pool; and
      bringing the customer network and/or a component of the customer network into a second predefined state.

3. The method of claim 1, further comprising:
   transferring a preset incoming or outgoing communication request and/or a service request of a user of the customer network to a mobile communication device of the user, based on the user not being checked in to the customer network.

4. The method of claim 1, further comprising:
   transferring a preset incoming or outgoing communication request and/or a service request of a user of the customer network to a virtual instance, based on the user not being checked in to the customer network.

5. The method of claim 1, further comprising:
   allocating the deallocated access port from the access network resource pool to another customer network.

6. The method of claim 1, further comprising:
   activating and/or providing additional resources in a mobile radio network, based on a user not being checked in to the customer network but checked in to the mobile radio network.

7. The method of claim 1, further comprising:
   load-adaptive switching and/or transferring network capacity in all network sections of the access network, the access network comprising a core network, on the basis of currently available capacity;
   wherein the currently available capacity is determined taking into account allocated and/or deallocated access ports of at least one customer network and/or taking into account users checked in to the access network but not checked in to the at least one customer network.

8. A system for dynamically allocating network resources in an access network and a customer network, comprising a central control unit at a data center, the central control unit comprising a processor and a non-transitory computer-readable medium having processor-executable instructions stored thereon, wherein the processor is configured to execute the processor-executable instructions to facilitate:
   determining positions of all users of the customer network;
   determining that no user of the customer network is checked in to the customer network based on the determined positions of all users of the customer network as being away from the customer network; and
   in response to determining that no use of the customer network is checked in to the customer network:
      bringing the customer network and/or a component of the customer network into a first predefined state; and
      deallocating an access port of an access multiplexer assigned to the customer network and transferring the deallocated access sort to an access network resource pool, wherein the access network resource pool comprises one or more unallocated access ports usable for access lines corresponding to customer networks.

9. The system of claim 8, wherein the processor-executable instructions, when executed, further facilitate:
   determining that a user of the customer network has returned to the customer network;

in response to determining that the user of the customer network has returned:
    allocating a new access port to the customer network from the access network resource pool; and
    bringing the customer network and/or a component of the customer network into a second predefined state.

10. The system of claim 8, wherein the processor-executable instructions, when executed, further facilitate:
    transferring a preset incoming or outgoing communication request and/or a service request of a user of the customer network to a mobile communication device of the user, if the user is not checked in to the customer network.

11. The system of claim 8, wherein the processor-executable instructions, when executed, further facilitate:
    transferring a preset incoming or outgoing communication request and/or a service request of a user of the customer network to a virtual instance, if the user is not checked in to the customer network.

12. The system of claim 8, wherein the processor-executable instructions, when executed, further facilitate:
    allocating the deallocated access port from the access network resource pool to another customer network.

13. The system of claim 8, wherein the processor executable instructions, when executed, further facilitate:
    activating and/or providing additional resources in a mobile radio network, if a user is not checked in to a customer network but is checked in to the mobile radio network.

14. The system of claim 8, wherein the processor-executable instructions, when executed, further facilitate:
    load-adaptive switching and/or transferring network capacity in all network sections of the access network, the access network comprising a core network, on the basis of currently available capacity,
    wherein the currently available capacity is determined taking into account allocated and/or deallocated access ports of at least one customer network and/or taking into account users checked in to the access network but not checked in to the at least one customer network.

15. A non-transitory processor-readable medium of a central control unit at a data center having processor-executable instructions stored thereon for dynamically allocating network resources in an access network and a customer network, the processor-executable instructions, when executed by a processor, facilitating performance of the following:
    determining positions of all users of the customer network;
    determining that no user of the customer network is checked in to the customer network based on the determined positions of all users of the customer network as being away from the customer network; and
    in response to determining that no user of the customer network is checked in to the customer network:
        bringing the customer network and/or a component of the customer network into a first predefined state, based on determining that no user of the customer network is checked in to the customer network; and
        deallocating an access port of an access multiplexer assigned to the customer network and transferring the deallocated access port to an access network resource pool, wherein the access network resource pool comprises one or more unallocated access ports usable for access lines corresponding to customer networks.

* * * * *